June 27, 1939.   O. H. UNDERDORFEL   2,164,149
AUTOMOBILE LIGHTING DEVICE
Filed May 10, 1937
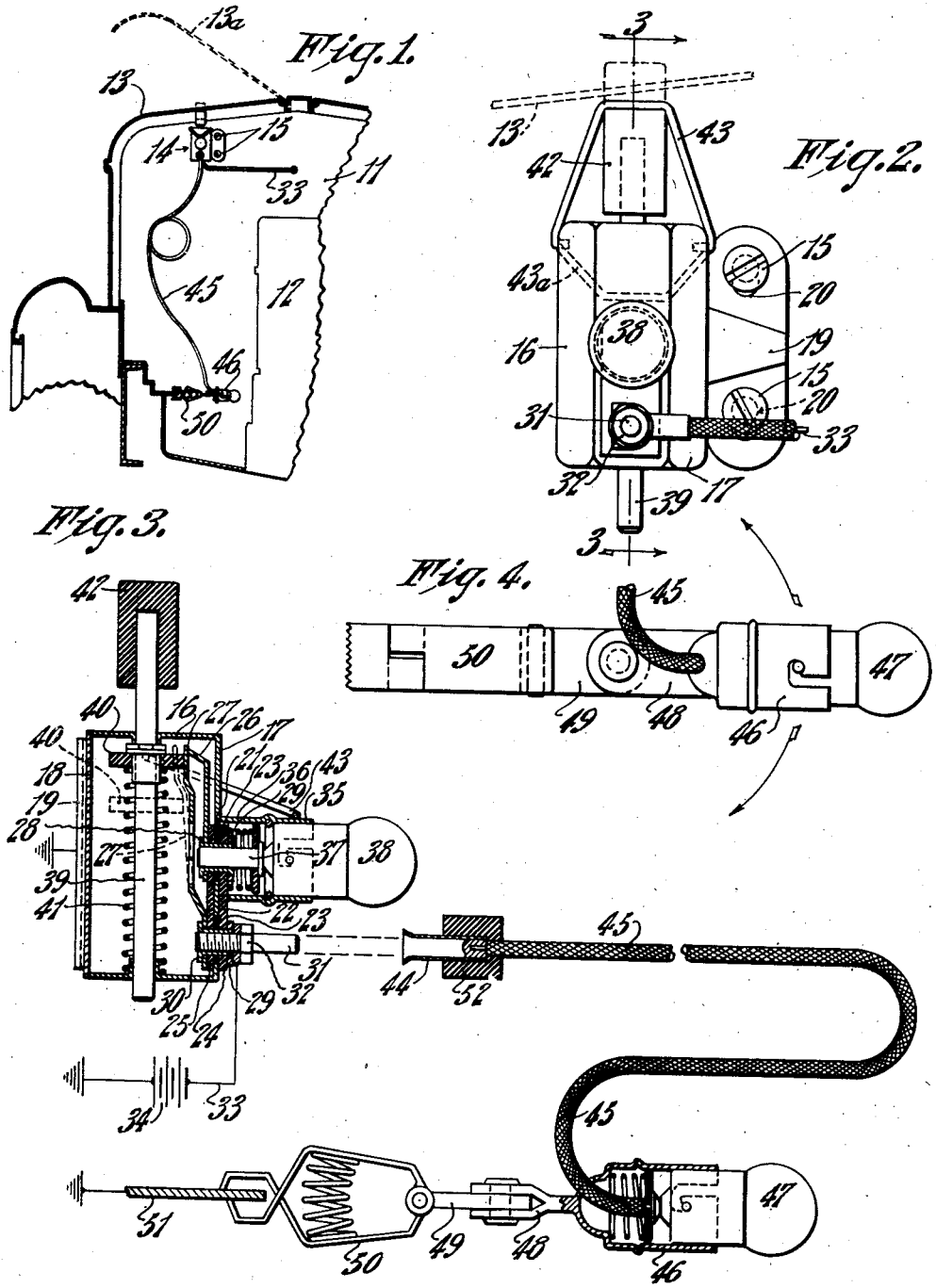
INVENTOR,
Oscar H. Underdorfel,
BY
Frank E. Haskell
ATTORNEY.

Patented June 27, 1939

2,164,149

UNITED STATES PATENT OFFICE 2,164,149

AUTOMOBILE LIGHTING DEVICE

Oscar H. Underdorfel, Holyoke, Mass.

Application May 10, 1937, Serial No. 141,617

4 Claims. (Cl. 240—8.18)

This invention relates to lighting equipment for automobiles and especially to equipment for illuminating the motor and other parts under the hood of the car.

It is one of the objects of the invention to provide such lighting equipment, to be operated from the storage battery of the car, so arranged that in case of trouble or a desire to inspect the oil, ignition or any other part of the mechanism after dark and while on some country road or unlighted highway it may be done with the minimum of inconvenience.

More specifically it is one of the objects of the invention to provide equipment of the foregoing character which shall be permanently mounted under the hood and which shall have means for automatically turning the light on when the hood is raised for inspecting the parts under the hood and which shall be automatically turned off when the hood is again lowered.

It is an object of the invention to provide a device for the foregoing purpose which shall comprise in a single unitary structure both the switch and the socket for the bulb thereby providing a device which is inexpensive to manufacture and easy to install, and which eliminates the cost of connecting wiring and the possibility of trouble therefrom.

It is a further object of the invention to provide means for turning the light off regardless of whether the hood is raised or lowered so that battery drain may be eliminated when a considerable amount of work is being done on the motor or other parts during daylight hours or when there is other light that is adequate.

It is also an object of the invention to provide along with the foregoing hood light an extension light for illuminating parts of the mechanism not adequately lighted by means of the permanently installed hood light and for illuminating parts of the car not under the hood such for example as one of the wheels during the changing of a tire.

It is a still further object of the invention to provide such an extension light of maximum simplicity in construction, which shall be as convenient as possible in use and which shall have little likelihood of getting out of order. More specifically it is an object of the invention to provide a one-conductor extension cord thereby simplifying the connecting plug and socket as well as other parts of the extension.

More generally it is an object of the invention to provide equipment of the foregoing character that shall be simple in construction and inexpensive to manufacture, that shall have the greatest possible convenience in use and which shall have long life and dependability.

In order to explain the invention more clearly reference is made to the following description of one embodiment thereof taken in connection with the accompanying drawing in which Fig. 1 is a more or less diagrammatic transverse section taken through the hood of an automobile looking toward the rear of the car and shows both the hood light and extension;

Fig. 2 is a similar, greatly enlarged view of the hood light alone and shows the means whereby the switch may be held open while the hood is in its raised position;

Fig. 3 shows to an enlarged scale and in section both the hood light and the extension cord and bulb and indicates somewhat diagrammatically the electrical connections of the different parts; and Fig. 4 is a view of the extension lamp, socket, clamp, and swivel joint taken in a direction at right angles to that shown in Fig. 3.

Referring to the drawing more in detail the reference character 11 indicates generally the frame of an automobile, 12 the engine, and 13 one side of the hood. The device which is the subject of the present invention is shown positioned slightly below the hood at 14 and is secured to some suitable portion of the car such as the back of the dashboard by means of bolts or machine screws 15. The device itself comprises a casing 16 of generally cylindrical form or of octagonal cross section and is preferably constructed in two halves or portions 17 and 18. The portion 17 carries the most of the internal mechanism and is suitably secured to the other portion 18 which has a projecting flange 19 with apertures 20 therein through which the bolts 15 pass and by means of which the device is fastened in place. Either the flange or the bolts must have contact with and make a good electrical connection with some grounded metallic portion of the car.

In the wall of the casing 16, preferably in that wall of portion 17 which is farthest from the surface on which the device is mounted, there are provided two apertures 21 and 22. Each of these apertures has therein an insulating bushing 23. A rectangular plate 24 of insulating material is positioned on the outside of the casing and has two apertures therein in register with the apertures 21 and 22. A similar insulating plate 25 is positioned within the casing on the opposite side of the wall and also has two apertures therein in register with the apertures 21 and 22. Within the casing 16 at the aperture 21 is positioned a stationary switch member 26 in the form of a flat strip of resilient material. This switch member is also provided with an aperture in register with the aperture 21. A movable switch member 27 of flat strip of resilient material having an aperture therein is positioned with its aperture in register with the aperture 22 in the casing. A flanged bushing or eyelet 28 is used for holding the parts together at the aperture 21. In assembling the parts the bushing is inserted, while the parts are in their proper place, through the aperture in the stationary switch member 26, through one of the apertures in the inside insulating plate 25, through the insulating bushing 23 positioned in the aperture 21 in the wall of the casing, and through one of the apertures in the outside insulating plate 24. A washer 29 is then placed over the eyelet or bushing and the end of the bushing swaged over the washer to hold the parts rigidly in place. A somewhat similar flanged bushing or eyelet 30, together with its washer 29, holds the movable switch member 27, and the other ends of the two plates 24 and 25 in place. The bushing 30 differs from the bushing 29 in that the former has a threaded inside aperture while the latter is smooth.

There is provided for the bushing 30 a combined binding post and attachment plug for an extension. This comprises a main cylindrical portion 31 threaded at one end for screwing into the threaded interior of the bushing 30 and smooth at the other end whereby it may be readily connected with the sleeve portion of a cord extension. An enlarged hexagonal portion or nut 32 is either formed integral with the cylindrical portion 31 or is so tightly screwed onto the portion 31 that it is practically impossible for the two parts to become separated through ordinary use. A conductor 33 is clamped under the nut 32 and leads to the ungrounded side of a battery 34 as shown diagrammatically in Fig. 3.

A lamp socket 35 has its shell 36 either integral with or suitably secured, as by brazing or soldering, to the casing 17 and has a spring-pressed center contact 37 slidable within and in contact with the bushing 28. A lamp bulb 38 is shown in place in the socket 35.

The operating mechanism for the switch members comprises a longitudinally slidable rod 39, disposed parallel to the general direction of the switch members 26 and 27, extending through apertures in the ends of the casing, a disc or collar 40 of insulating material secured to the rod 39, and a helical compression spring 41 mounted on the rod between the collar 40 and the end wall of the casing. The upper end of the movable switch member 27 is provided with an offset portion so that when the spring 41 has moved the rod 39 and disc 40 upward as far as they will go, which limiting position may be determined by the disc 40 striking against the casing or some portion thereof, the disc will press the end of the movable switch member 27 against the end of the stationary switch member 26 and complete the circuit. The upper end of the rod 39 is provided with a button or knob 42 of some material that is preferably non-metallic and softer than the end of the rod and also affords an end surface which rubs against the hood of somewhat larger extent than the end of the rod.

When the hood 13 is in its lowered position, as shown in full lines in Fig. 1, it will press the knob 42 downward and also move the disc 40 downward and into the position shown by dotted lines in Fig. 3. This permits the movable switch member 27 to move under the action of its own resiliency into the dotted line position and thus break the circuit. When the hood is in its raised position, as shown in dotted lines at 13a in Fig. 1, the spring 41 pushes the disc 40 and rod 39 upwardly so that the disc 40 in passing alongside of the offset portion of the movable switch member 27 closes the circuit, as shown in full lines in Fig. 3, and lights the bulb. It will be seen that by this means the switch is automatically closed and the bulb lighted whenever the hood is raised and as soon as the hood is lowered the light is automatically turned off.

Whenever it becomes desirable at night time, particularly on an unlighted highway, to inspect the engine or any part of the mechanism under the hood, the mere raising of the hood enables a person to see the parts well lighted. Not only is the lighting automatic in operation but because of its permanent installation there is no danger of its being misplaced just when most needed as frequently happens with a flashlight.

In case a considerable amount of work is being done on the car with the hood raised either during the daytime or when there is provided other adequate illumination, it is desirable that there be provided means for disconnecting the light even though the hood be in its raised position. This means may be in the form of a loop of stiff wire 43 having its ends pivotally supported in apertures in the walls of the casing 16. When this loop 43 is turned downward as shown in Fig. 3 the switch is operated automatically as already described; when the loop is turned upward with its middle portion over the knob 42, as shown in Fig. 2, the switch is locked in its open position irrespective of the position of the hood.

For convenience in examining some part of the mechanism not well lighted by the bulb 38 there may be provided an extension. An insulating member 52 is provided with an opening in which there is positioned a sleeve 44 having an interior diameter equal to the exterior diameter of the cylindrical portion 31 of the binding post. A single-conductor cord 45 is connected at one end to the sleeve 44 in any suitable manner and is connected at its other end to the center contact of a socket 46. The socket 46 has a bulb 47 positioned therein and at its opposite end is provided with a bifurcated arm 48. Between the two branches of this bifurcated arm 48 there is positioned a tongue 49 which extends from a spring-retracted connecting clip 50. This clip is shown clamped to a grounded portion 51 of the car which is the normal way of connecting and lighting the bulb 47. It will be observed that the electrical circuit for the extension bulb can be traced from the ungrounded side of the battery through the conductor 33 to the combined binding post and cord connector 31, to the single-conductor cord 45, and thence to the center contact of the socket 46 and bulb 47. The other terminal of the bulb 47 is connected through the shell of the socket to the bifurcated arm 48, through the clip 50 to the grounded portion 51 of the car and thence to the grounded side of the battery. It will be noticed that this single-conductor extension results in several very distinct advantages. It is simpler in construction and less expensive to manufacture throughout, the detachable connector especially, and it is also free from all kinds of short circuits within the cord itself no matter how worn it may become.

It is to be understood that the foregoing embodiment of the invention has been selected for purposes of illustration only and that various changes may be made therein without departing from the spirit and scope of the invention as defined in the subjoined claims.

I claim:

1. A combined hood light and automatic switch comprising a metallic casing adapted to be secured to the grounded frame of an automobile just beneath the hood, an insulating plate secured to said casing, a pair of spaced terminals mounted on said insulating plate, each terminal extending from outside the casing to the inside of the casing, a socket mounted outside of said casing coaxially with one of said terminals with its center contact electrically connected with the terminal and its shell integral with the casing, switch means for connecting together said terminals positioned within said casing, operating means for said swich means extending outside of said casing and adapted to be positioned in the path of movement of the hood of the automobile, a screw threaded member for clamping a conductor to the other of said terminals and having integral therewith a pin for connection with the sleeve member of a detachable connector of an extension cord.

2. In a device for automatically lighting the space under the hood of an automobile when the hood is in its raised position, a metallic casing, means for securing said casing to the grounded frame of the automobile just beneath the hood, an insulating strip secured to said casing, a pair of spaced terminals mounted on said strip, a socket having its shell connected with said casing and having its center contact connected with one of said terminals, means for connecting the other terminal to the ungrounded side of the lighting battery of the automobile, means for connecting and disconnecting said terminals positioned within said casing and mounted for reciprocating movement longitudinally thereof and having a portion of said means projecting beyond the casing and into the path of movement of said hood, resilient means connected with said reciprocating means so as to press said projecting portion outwardly away from said casing and to move the connecting and disconnecting means into the closed position, and a loop of wire pivotally supported at its two ends in the walls of said casing with its intermediate portion movable into a position over the end of said projecting portion for detachably holding the switch in its open position.

3. A combined hood light and automatic switch comprising a metallic casing adapted to be secured to the grounded frame of an automobile just beneath the hood, a pair of spaced terminals mounted on the interior of said casing and insulated therefrom, a socket mounted on the exterior of said casing having an exterior shell integral with the casing and having a center contact connected to one of said terminals, switch means for connecting together said terminals positioned within said casing, operating means for said switch positioned outside of said casing in the path of movement of the hood of the automobile, and a clamping member for attaching a conductor from the ungrounded side of the battery to the other of said terminals, said clamping member having a pin integral therewith for connection with the sleeve member of a detachable connector of a single conductor extension cord.

4. In a device for automatically lighting the space under the hood of an automobile when the hood is in its raised position, a metallic casing, means for securing said casing to the grounded frame of the automobile just beneath the hood, a pair of spaced terminals mounted on the inner wall of said casing, a socket having an outer shell connected with said casing and having a center contact connected with one of said terminals, means for connecting the other terminal to the ungrounded side of the lighting battery of the automobile, means for connecting and disconnecting said terminals positioned within said casing and having a portion thereof projecting beyond the casing and into the path of movement of said hood, resilient means connected with said connecting and disconnecting means so as to press said projecting portion outwardly away from said casing and to move the connecting and disconnecting means into the closed position, and a loop of wire pivotally supported at its two ends in the walls of said casing with its intermediate portion movable into a position over the end of said projecting portion for detachably holding the switch in its open position.

OSCAR H. UNDERDORFEL.